US006672682B2

(12) United States Patent
Ewing et al.

(10) Patent No.: US 6,672,682 B2
(45) Date of Patent: Jan. 6, 2004

(54) PRESSURE RELEASABLE VEHICLE PEDAL ASSEMBLY

(75) Inventors: Kip Alan Ewing, Dearborn, MI (US); Gerard Edward Baker, Essex (GB); Bruce Frederick Pease, Riverview, MI (US); Jeffrey Dan Rupp, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/248,638

(22) Filed: Feb. 3, 2003

(65) Prior Publication Data

US 2003/0094852 A1 May 22, 2003

Related U.S. Application Data

(63) Continuation of application No. 09/504,416, filed on Feb. 15, 2000.

(51) Int. Cl.[7] .............................................. B60T 17/00
(52) U.S. Cl. ...................... 303/1; 303/157; 303/177; 303/191; 180/275
(58) Field of Search ............................ 303/122, 122.11, 303/157, 177, 191, 81, 1; 180/274, 275, 282, 232, 271

(56) References Cited

U.S. PATENT DOCUMENTS

| | | | |
|---|---|---|---|
| 3,608,982 A | 9/1971 | Inada et al. ................... 303/21 |
| 3,664,130 A | 5/1972 | Meyers ........................... 60/54 |
| 3,945,672 A | 3/1976 | Wong ............................. 293/5 |
| 4,172,603 A | 10/1979 | St. Clair et al. ............. 280/734 |
| 4,319,455 A | 3/1982 | Schubert ...................... 60/547 |
| 4,964,485 A | 10/1990 | Miele ........................... 180/275 |
| 4,971,402 A | 11/1990 | Chen ........................... 303/113 |
| 5,066,076 A | 11/1991 | Tröster ........................ 303/113 |
| 5,249,646 A | 10/1993 | Thiel ............................. 188/71 |
| 5,531,135 A | 7/1996 | Dolla ............................ 74/512 |
| 5,615,749 A | 4/1997 | Kato ........................... 180/274 |
| 5,634,337 A | 6/1997 | Gautier et al. ................ 60/554 |
| 5,647,647 A | 7/1997 | Kato et al. .................. 303/122 |
| 5,737,919 A | 4/1998 | Gautier et al. ................ 60/403 |
| 5,778,732 A | 7/1998 | Patzelt et al. ................. 74/512 |
| 5,797,264 A | 8/1998 | Verbo et al. .................. 60/547 |
| 5,848,558 A | 12/1998 | Isono et al. ................... 74/512 |
| 5,848,662 A | 12/1998 | Sakaue ........................ 180/274 |
| 5,896,781 A | 4/1999 | Müller ......................... 74/512 |
| 5,916,330 A | 6/1999 | Jacobson ..................... 74/512 |
| 5,921,144 A | 7/1999 | Williams, Jr. et al. ........ 74/512 |
| 5,927,821 A | 7/1999 | Bauer et al. ................... 303/1 |
| 5,975,231 A | 11/1999 | Hirato ........................ 180/274 |
| 6,006,626 A | 12/1999 | Notake et al. ................ 74/512 |
| 6,041,601 A | 3/2000 | Verbo et al. ............... 60/547.1 |
| 6,079,207 A | 6/2000 | Stadler et al. ................ 60/533 |

(List continued on next page.)

Primary Examiner—Jack Lavinder
Assistant Examiner—Benjamin A. Pezzlo
(74) Attorney, Agent, or Firm—Gregory P. Brown

(57) ABSTRACT

A releasable brake pedal system 10 for a vehicle includes a pedal assembly 12 operatively engageable by the driver of the vehicle and a hydraulic actuator assembly 20 for generating pressurized hydraulic fluid for actuating one or more brakes 44A–44D. The pedal system 10 further includes a pressure release valve 30 or 30' coupled in fluid communication with the pressurized hydraulic fluid. The pressure release valve 30 or 30' is operative to reduce the amount of pressure applied to the brakes 44A–44D during a detected vehicle deceleration indicative of a collision event. The pressure release valve 30 is responsive to a deceleration sensor 40 according to one embodiment, and valve 30' employs a deceleration sensitive inertial mass 76 according to another embodiment. Accordingly, the pedal system 10 reduces forces that may otherwise be transferred to the pedal assembly 12 during a collision.

20 Claims, 3 Drawing Sheets

U.S. PATENT DOCUMENTS

| | | | |
|---|---|---|---|
| 6,112,616 A | 9/2000 | Schonlau et al. | 74/512 |
| 6,134,492 A | 10/2000 | Breed et al. | 701/49 |
| 6,178,846 B1 | 1/2001 | Specht et al. | 74/512 |
| 6,309,031 B1 * | 10/2001 | Crombez et al. | 303/113.4 |
| 6,357,838 B1 * | 3/2002 | Chi | 303/116.2 |
| 6,364,046 B1 * | 4/2002 | Forssell et al. | 180/275 |
| 6,499,376 B2 * | 12/2002 | Thistleton et al. | 74/512 |
| 6,520,044 B1 * | 2/2003 | Douglass | 74/512 |

* cited by examiner

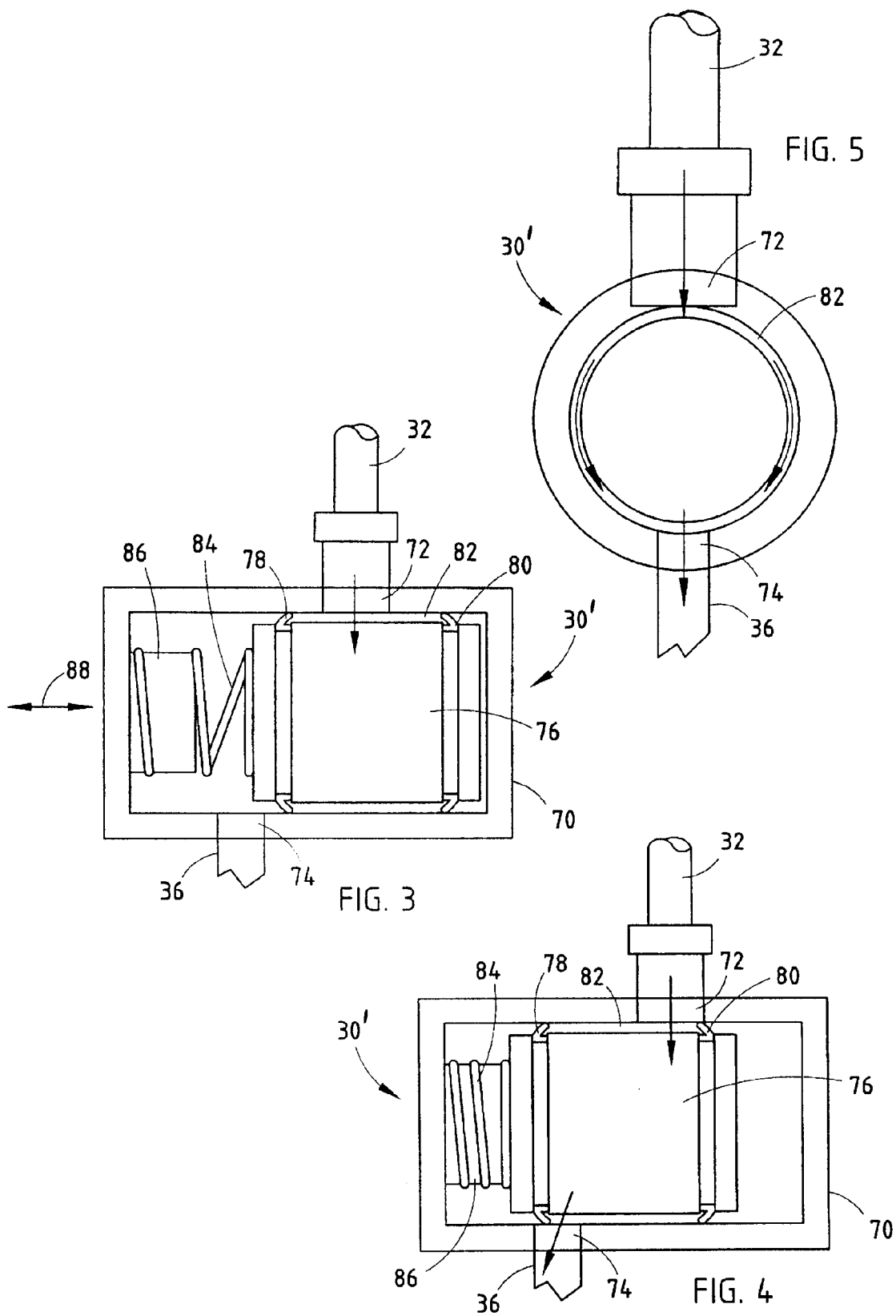

PRESSURE RELEASABLE VEHICLE PEDAL ASSEMBLY

CROSS REFERENCE TO RELATED APPLICATION

This application is a continuation of application Ser. No. 09/504,416, entitled "PRESSURE RELEASABLE VEHICLE PEDAL ASSEMBLY," filed on Feb. 15, 2000.

BACKGROUND OF INVENTION

The present invention generally relates to vehicle pedal assemblies, and more particularly, to a pedal assembly, such as a brake pedal assembly, that is releasable from an operative condition upon imposition of a frontal load to an automotive vehicle.

It is generally known in the automotive vehicle design arts that it is desirable to configure components arranged within the passenger compartment of the vehicle to reduce adverse effects on the vehicle occupants when subjected to high forces such as are experienced in a collision. While many vehicle interior components facing the vehicle occupants are designed to minimize the forces during a collision impact, foot pedal assemblies, such as the brake pedal assembly which is generally positioned below the instrument panel of the vehicle in the driver's compartment, may transfer collision caused intrusive forces to the driver's leg. This is because in a severe frontal collision, deformation of the vehicle dash panel can cause the foot pedal assembly to move rearward toward the vehicle occupants. In addition, this rearward translation is often accompanied by some degree of rotation about a lateral axis of the mounting plane of the pedal assembly. Likewise, the reaction of the occupant in the collision can force the occupant's legs into the foot pedal controls.

Conventional vehicle foot pedal assemblies, such as the brake pedal, clutch pedal, and acceleration pedal assemblies, are commonly assembled together in a pedal box assembly which typically is rigidly connected to the vehicle dash. Foot pedal assemblies employed with hydraulic fluid actuated systems, such as the brake pedal assembly, generally have a foot pedal pad connected to a lever and a piston push rod, with assist from a vacuum booster, that compresses a master cylinder which in turn generates hydraulic fluid pressure. As the brake pedal assembly is moved rearward toward the driver due to collision caused intrusion forces, the hydraulic resistance in the master cylinder applied against the brake pedal assembly may in some instances cause the brake pedal to inflict injury to the driver's legs. In addition, the hydraulic resistance in the master cylinder may cause the brake pedal to damage lower extremities of the occupant due to the reaction of the occupant in a collision, independent of the dash and pedal intrusion forces.

One approach to minimizing such forces during a severe frontal collision includes structurally connecting the pedal box assembly to a cowl structure which remains relatively stable relative to the dash panel. With the pedal box assembly structurally connected to the cowl structure, relative movement can be made to cause a failure in the structure supporting the pivots of the pedal box assembly, thus allowing the pedals to move freely with little constraint following a severe frontal collision. Other approaches have included the use of mechanical connections, such as a cable, between the cowl, or some other relatively stable structure, and the pedal box. With these approaches, the deflection of the pedal assembly relative to the stable structure during a severe frontal collision is used to actively depress the pedal through the action of the aforementioned mechanical connection. However, the aforementioned approaches significantly increase the cost and complexity of the pedal box assembly, and may render the pedal assemblies inoperative following a vehicle collision.

Accordingly, there exists a need, heretofore unfulfilled, for a cost efficient device for use in a vehicle, that reduces the intrusion forces imparted to the occupant by the pedal assembly, and which reduces the forces imparted upon the occupant as the occupant reacts against the pedal assembly during a collision event.

SUMMARY OF INVENTION

In accordance with the teachings of the present invention, a releasable pedal system, such as a brake pedal system, for a vehicle is provided which reduces forces, such as intrusion forces, applied to the pedal system during a vehicle collision. The pedal system includes a pedal assembly that is operatively engageable by an occupant of the vehicle, and an actuator assembly for generating an amount of pressurized fluid. The releasable pedal system further includes a pressure release valve coupled in fluid communication with the pressurized fluid. The pressure release valve is operative to reduce the amount of pressurized fluid during a detected vehicle deceleration indicative of a vehicle collision. Accordingly, the releasable pedal system of the present invention advantageously reduces the forces transferred to the pedal assembly during a collision.

These and other features, advantages and objects of the present invention will be further understood and appreciated by those skilled in the art by reference to the following specification, claims and appended drawings.

BRIEF DESCRIPTION OF DRAWINGS

In the drawings:

FIG. 3 is a diagrammatic view of a pressure release valve that may be employed in the brake pedal system according to another embodiment of the present invention, and shown in the normally closed position.

FIG. 4 is a diagrammatic view of the pressure release valve of FIG. 3 shown in the open position during a vehicle collision.

FIG. 5 is a diagrammatic view of the pressure release valve of FIG. 3 further illustrating the hydraulic fluid flow in the open position.

DETAILED DESCRIPTION

Figure 1:
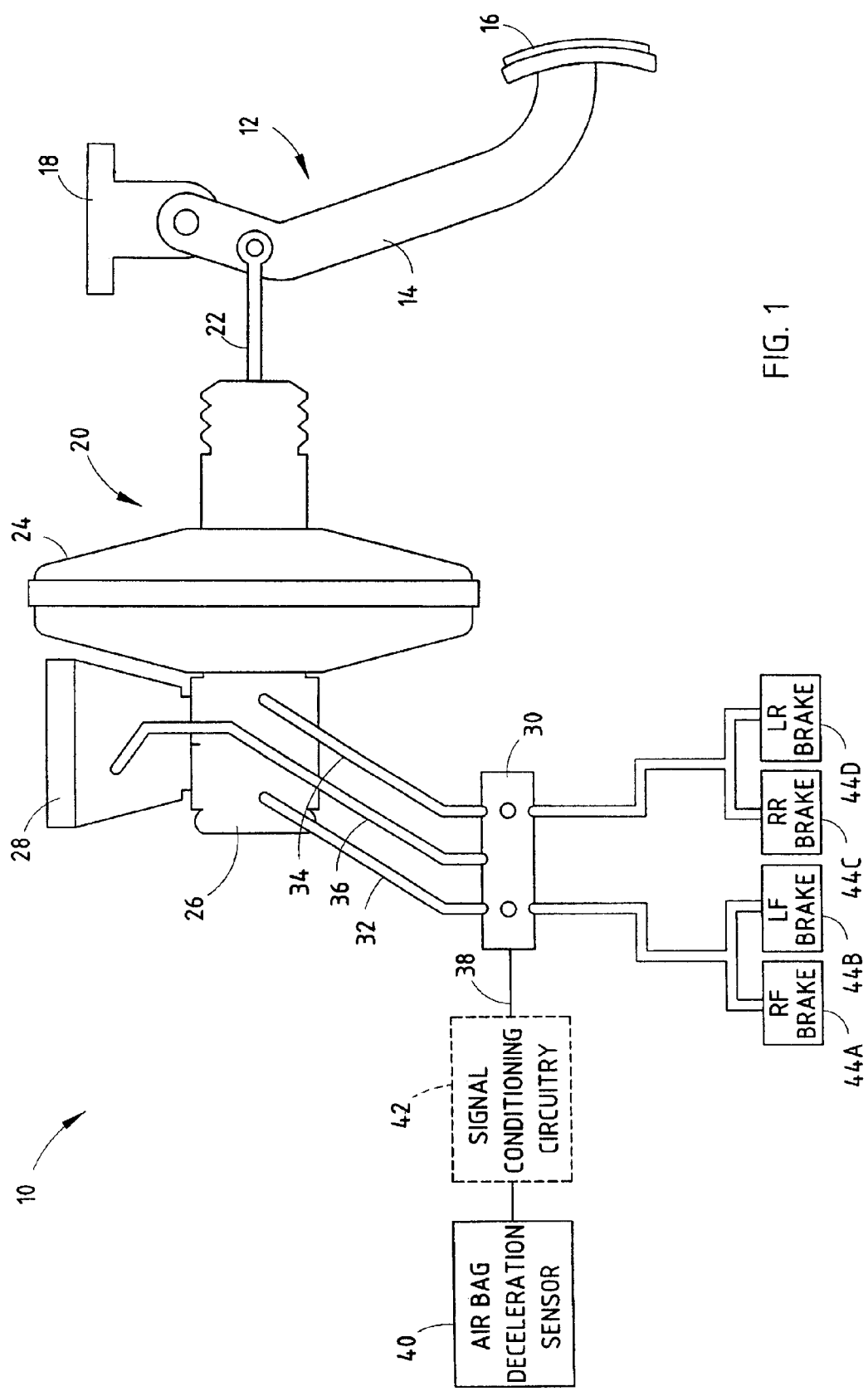
FIG. 1 is a diagrammatic view of a brake pedal system having a pressure release valve according to one embodiment of the present invention.

Referring to FIG. 1, a hydraulic brake system 10 is shown according to one embodiment of the present invention for use in braking a vehicle, such as an automobile. The brake system 10 has a brake pedal assembly 12 generally located in the passenger compartment, generally defined rearward of a dash panel in the vehicle. The brake pedal assembly 12 includes an elongated pedal 14 pivotally mounted at its upper end to a pivotal connection 18 which in turn is generally rigidly secured to the dash panel. Proximate the lower end of the pedal 14 is a pedal pad 16 which is configured to be operatively engageable with the foot of the vehicle operator, i.e., driver, to pivot the pedal 14 clockwise as shown in FIG. 1 to actuate the braking system. The brake pedal assembly 12 further includes a piston push rod 22 assembled to pedal 14. Push rod 22 is axially movable in cooperation with pedal 14 and operatively engages a brake actuator assembly 20.

The brake actuator assembly 20 is equipped with a vacuum booster 24, a brake master cylinder 26, and a hydraulic fluid storage reservoir 28. Storage reservoir 28 contains a reserve of non-pressurized hydraulic brake fluid. The vacuum booster 24 provides assist to the piston push rod 22 to actuate the master cylinder 26. The master cylinder 26, in cooperation with the vacuum booster 24, generates a controlled amount of hydraulic fluid pressure in response to axial movement of piston push rod 22, which in turn is responsive to operator actuation of pedal pad 16, as is generally known in the art. The brake actuator assembly 20 made up of vacuum booster 24, master cylinder 26 and reservoir 28, as well as the brake pedal assembly 12 made up of pedal 14, pedal pad 16 and push rod 22, may include conventional brake system assemblies.

The vehicle brake system 10 is shown having four brakes including the right front brake 44A, left front brake 44B, left rear brake 44C, and right rear brake 44D, according to one example. Brakes 44A–44D provide friction braking to brake the corresponding wheels on the vehicle in response to the hydraulic fluid pressure generated by the actuator assembly 20. Each of brakes 44D–44D may include conventional brake assemblies made up of calipers/cylinders and brake pads as is commonly known in the vehicle brake art.

In addition, primary and secondary brake hydraulic circuits 32 and 34 provide hydraulic brake fluid flow paths between the master cylinder 26 and each of brakes 44D–44D. According to the example shown, hydraulic circuit 32 is coupled to brakes 44A and 44B, while hydraulic circuit 34 is coupled to brakes 44C and 44D. However, it should be appreciated that one or more hydraulic circuits may be employed and may be otherwise connected to one or more brakes. For example, the brake circuits could be diagonally biased, as is commonly known in the vehicle brake art. A brake fluid return line 36 is also provided to serve as a return path to allow brake fluid to be expelled from one or both of the brake hydraulic circuits 32 and 34 and returned to the brake fluid reservoir 28, according to one example.

According to the present invention, a pressure release valve 30 is employed in fluid communication with one or both of the primary and secondary brake hydraulic circuits 32 and 34 and is operative to reduce the brake fluid pressure during a vehicle collision. The pressure release valve 30 may be connected in series or otherwise tapped into one or both of hydraulic circuits 32 and 34. The pressure release valve 30 may include a solenoid operated, or otherwise actuated, hydraulic valve that is normally closed to prevent the release of hydraulic brake fluid pressure. It should be appreciated that pressure release valve 30 continuously allows hydraulic brake fluid flow between the master cylinder 26 and each of brakes 44D–44D, and preferably is operable only to discharge brake fluid to reduce brake fluid pressure during a vehicle collision. According to the embodiment shown, pressure release valve 30, when actuated to the open position during a vehicle collision, discharges brake fluid into the brake fluid reservoir 28 via return line 36. Accordingly, the discharged brake fluid is recovered and is reusable without introducing air into the brake circuits.

Pressure release valve 30 is actuated to the open position to release brake fluid pressure in response to a sensed deceleration signal 38 indicative of a vehicle collision. The deceleration signal 38 may be generated by an air bag deceleration sensor 40 or an air bag activation signal. The air bag deceleration sensor 40, which is generally commonly available on many modern automotive vehicles equipped with air bags, senses vehicle deceleration to detect the occurrence of a vehicle collision event. The deceleration signal 38 generated by sensor 40 may be processed via optional signal conditioning circuitry 42, which may include a relay, a microprocessor, or other control device such as an air bag controller that generates an air bag activation signal.

Figure 2:
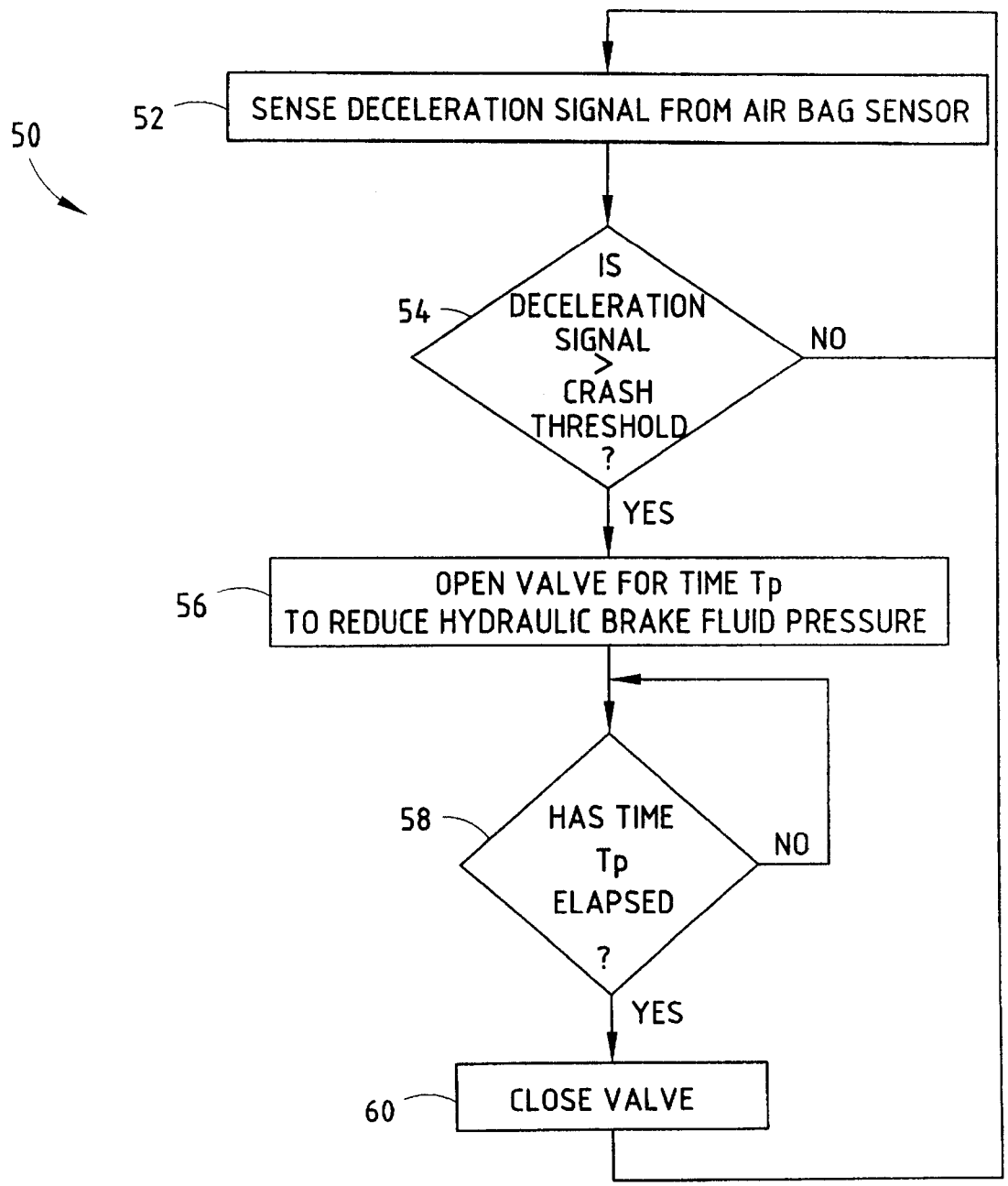
FIG. 2 is a flow diagram illustrating a method of reducing hydraulic fluid pressure in the brake system of FIG. 1 during a vehicle collision.

Referring to FIG. 2, a methodology 50 of controlling the vehicle brake system 10 shown in FIG. 1 to release brake fluid pressure during a vehicle collision is illustrated therein. The brake control methodology 50 includes step 52 of sensing a deceleration signal generated by an air bag deceleration sensor. Decision block 54 checks if the deceleration signal is greater than a crash threshold value and, if not, returns to step 52 to sense the deceleration signal from the air bag deceleration sensor. If the sensed deceleration signal is greater than the crash threshold value, methodology 50 proceeds to step 56 to open the pressure release valve 30 for a period of time $T_p$ to reduce hydraulic brake fluid pressure applied to the vehicle brakes. The temporary reduction of brake fluid pressure reduces the amount of intrusion forces that would otherwise be transferred to the brake pedal assembly. Decision block 58 checks for whether the pressure release time $T_p$ has elapsed. The pressure release time $T_p$ may be set to a time interval sufficient to mitigate negative effects on the vehicle occupant. Once the time period $T_p$ has elapsed, methodology 50 proceeds to step 60 to close the pressure release valve 30 to allow the brake system to resume normal braking operations. Following closure of the pressure release valve, methodology 50 returns back to step 52 to repeat the aforementioned steps, and therefore may again release brake fluid pressure upon detecting another vehicle collision.

Referring to FIG. 3, a mechanically actuated pressure release valve 30' is illustrated which may be employed in place of the solenoid actuated valve 30 and air bag deceleration sensor 40 with signal conditioning circuitry 42 described above, according to a second embodiment of the present invention. The mechanically actuated pressure release valve 30' has a built-in movable mass deceleration sensing mechanism that senses deceleration of the vehicle indicative of the imposition of a frontal load during a collision, and automatically opens the hydraulic fluid path between at least one of the primary and secondary brake hydraulic circuits 32 and 34 to the return line 36 to thereby reduce the amount of hydraulic fluid pressure applied to the vehicle brakes.

The pressure release valve 30' has a housing 70 formed an with inlet port 72 coupled to one of the brake hydraulic circuits, such as primary circuit 32, and a pressure release outlet port 74 that is shown coupled to return line 36. Housing 70 defines a container which houses a movable inertial mass 76. Inertial mass 76 is preferably cylindrical and has a pair of O-ring seals 78 and 80 spaced apart from each other on opposite ends of inertial mass 76 to define a fluid path 82 therebetween. Inertial mass 76 is movable along axis 88 which is substantially aligned with the longitudinal axis of the vehicle. Disposed between one end of housing 70 and one end of inertial mass 76 is a coil spring 84 and a stop member 86. Spring 84 biases the inertial mass 76 towards a normally closed position to prevent brake fluid flow between the inlet port 72 and outlet port 74.

Inertial mass 76 is slidably movable along the axis 88 upon experiencing a sufficient amount of deceleration along the axis 88, which is generally indicative of a severe frontal collision of the vehicle. During a vehicle collision event, inertial mass 76 slidably moves from the normally closed position to a pressure release open position in which fluid path 82 is in fluid communication with both inlet port 72 and outlet port 74 as is shown in FIG. 4. The travel of inertial mass 76 to the fully open valve position is limited by stop member 86. Inertial mass 76 remains in the open valve pressure release position as long as the vehicle deceleration is of a sufficient amount. Once the vehicle deceleration decreases below the sufficient amount, inertial mass 76 is biased back towards its normally closed position to prevent further discharge of hydraulic brake fluid via outlet port 74. The pressure release valve 30' may serve to provide variable pressure release in which the amount of hydraulic fluid pressure released is a function of the vehicle deceleration. Accordingly, a greater vehicle deceleration may result is increased pressure release.

The pressure release fluid flow path through valve 30' in the open valve position is further shown in FIG. 5. With the valve 30' open, hydraulic brake fluid is released from brake hydraulic circuit 32 via a fluid flow path through inlet port 72, fluid flow path 82, to outlet port 74, where it may be discharged to the brake fluid reservoir 28 via return line 36. While brake fluid pressure is released from hydraulic circuit 32 via return line 36, it should be appreciated that the hydraulic brake fluid pressure may be released from one or both of hydraulic circuits 32 and 34 and discharged through other fluid paths.

Accordingly, the brake pedal assembly advantageously is at least partially released upon imposition of a detected frontal load to the vehicle. While the present invention has been described herein in connection with reducing forces, such as intrusion forces, transferred through a hydraulic brake pedal assembly during a vehicle collision, it should be appreciated that the present invention may be used with other types of pedal assemblies to minimize adverse affects on the vehicle occupants for example, the present invention may be used to reduce such forces transferred through a hydraulic clutch assembly pedal.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

What is claimed is:

1. A releasable pedal system for an automotive vehicle, said system comprising:
    a pedal assembly including a pedal operatively engageable by a vehicle operator;
    an actuator assembly for pressurizing a fluid to generate an amount of fluid pressure responsive to the pedal assembly, said actuator assembly comprising a fluid supply reservoir for containing a reserve of non-pressurized fluid; and
    a pressure release valve coupled in fluid communication with the pressurized fluid and operable to release pressurized fluid to the fluid supply reservoir so as to reduce the amount of fluid pressure in response to detecting a vehicle collision.

2. The system as defined in claim 1, wherein said pedal assembly comprises a brake pedal assembly.

3. The system as defined in claim 1 further comprising a fluid path coupled between the pressure release valve and the fluid supply reservoir.

4. The system as defined in claim 1 further comprising a deceleration sensor for sensing deceleration of the vehicle, wherein said pressure release valve is actuated in response to said sensed deceleration.

5. The system as defined in claim 1, wherein said pressure release valve comprises a spring biased inertial mass that is movable in response to deceleration to open a fluid path to reduce the amount of fluid pressure.

6. The system as defined in claim 1, wherein said actuator assembly comprises a hydraulic actuator assembly for pressurizing hydraulic fluid.

7. The system as defined in claim 1, wherein the actuator assembly further comprises a master cylinder.

8. A method of controlling the fluid pressure in a pedal system having a pedal assembly in a vehicle, said method comprising the steps of:
    containing a reserve of non-pressurized fluid in a fluid supply reservoir;
    pressurizing the fluid to generate an amount of fluid pressure in response to actuation of a pedal assembly;
    detecting vehicle deceleration indicative of a collision; and
    reducing the amount of fluid pressure by releasing pressurized fluid to the fluid supply reservoir in response to said detected vehicle deceleration to reduce collision caused intrusion force transferable to the pedal assembly.

9. The method as defined in claim 8, wherein the step of generating an amount of pressurized fluid is performed by an actuator assembly comprising a master cylinder and the fluid supply reservoir.

10. The method as defined in claim 9, wherein the step of pressurizing the fluid to generate an amount of fluid pressure comprises actuating the master cylinder of the actuator assembly.

11. The method as defined in claim 8, wherein the step of releasing pressurized fluid to the fluid supply reservoir further comprises releasing pressurized fluid to a fluid path in fluid communication with the fluid supply reservoir.

12. The method as defined in claim 8, wherein the method controls fluid pressure in a brake pedal system having a brake pedal assembly.

13. The method as defined in claim 8, wherein said step of detecting vehicle deceleration comprises sensing vehicle deceleration with a deceleration sensor.

14. The method as defined in claim 8, wherein said step of detecting vehicle deceleration comprises detecting movement of a spring biased inertial mass and said step of reducing the amount of fluid pressure comprises controlling a valve responsive to movement of the spring biased inertial mass.

15. A releasable pedal system for an automotive vehicle, said system comprising:
    a pedal assembly including a pedal operatively engageable by a vehicle operator;
    an actuator assembly for generating an amount of pressurized fluid responsive to the pedal assembly; and
    a pressure release valve coupled in fluid communication with the pressurized fluid and operable to release pressurized fluid to reduce the amount of pressurized fluid in response to detecting a vehicle collision, wherein the pressure release valve comprises a housing having an inlet port and an outlet port, an inertial mass disposed in the housing and movable in response to deceleration to open a fluid path to reduce the amount of pressurized fluid, and a spring disposed in the housing and biasing the inertial mass to a closed valve position.

16. The system as defined in claim 15, wherein the pedal assembly comprises a brake pedal assembly.

17. The system as defined in claim 15, wherein said actuator assembly comprises a hydraulic actuator assembly for generating pressurized hydraulic fluid.

18. A method of controlling a fluid pressure in a pedal system having a pedal assembly in a vehicle, said method comprising the steps of:

generating an amount of pressurized fluid in response to actuation of a pedal assembly;

detecting a vehicle deceleration indicative of a collision by providing a spring biased inertial mass that is movable in response to deceleration; and reducing the amount of pressurized fluid by releasing pressurized fluid in response to movement of the inertial mass that opens a fluid path to reduce the amount of pressurized fluid and thus reduce collision caused intrusion force transferable to the pedal assembly.

19. The method as defined in claim 18, wherein the step of reducing the amount of pressurized fluid includes returning the released pressurized fluid to a fluid supply reservoir containing non-pressurized fluid.

20. The method as defined in claim 18, wherein the method controls fluid pressure in a brake pedal system having a brake pedal assembly.

* * * * *